United States Patent [19]

Pollack

[11] Patent Number: 5,797,413

[45] Date of Patent: Aug. 25, 1998

[54] OFFSHORE FLUID SWIVEL SPARE

[75] Inventor: Jack Pollack, Calabasas Hills, Calif.

[73] Assignee: Imodco, Inc., Calabasas Hills, Calif.

[21] Appl. No.: 780,579

[22] Filed: Jan. 8, 1997

[51] Int. Cl.$^6$ ................................ F16L 27/06
[52] U.S. Cl. ..................... 137/1; 137/580; 285/136; 285/190
[58] Field of Search ............... 285/136, 190; 137/580, 1

[56] References Cited

U.S. PATENT DOCUMENTS

| 2,343,491 | 3/1944 | Bard | 285/190 |
|---|---|---|---|
| 2,913,002 | 11/1959 | Janas | 137/580 |
| 4,126,336 | 11/1978 | Ortloff et al. | 285/190 |
| 4,391,298 | 7/1983 | Ortloff | 137/580 |
| 4,405,162 | 9/1983 | Williams | 285/136 |
| 4,647,077 | 3/1987 | Ethridge et al. | 285/190 |

Primary Examiner—A. Michael Chambers
Attorney, Agent, or Firm—Freilich Hornbaker Rosen

[57] ABSTRACT

A fluid swivel arrangement comprising a vertical stack of fluid swivels mounted on a turret of a weathervaning ship, enables a spare fluid swivel to be provided without requiring an additional pipe and consequent larger diameter of fluid swivels. A pair of fluid swivels (53, 54) are provided, with one serving as a spare to be used in the event of failure of the other. A single pipe (94) extends through holes (120) in the swivels and is coupled to the inlet ports (90, 92) of both swivels, so it can direct fluid into either one. A means for controlling flow, enables the flow to be switched to either fluid swivel. The means for controlling flow can include a plug (140) for insertion into the inlet port of one of the swivels, to block the inflow of fluid thereat. The means for controlling flow can also include a valve (130) lying along the pipe between the upper and lower fluid swivels, so when the valve is closed fluid flows only to the lower fluid swivel.

9 Claims, 2 Drawing Sheets

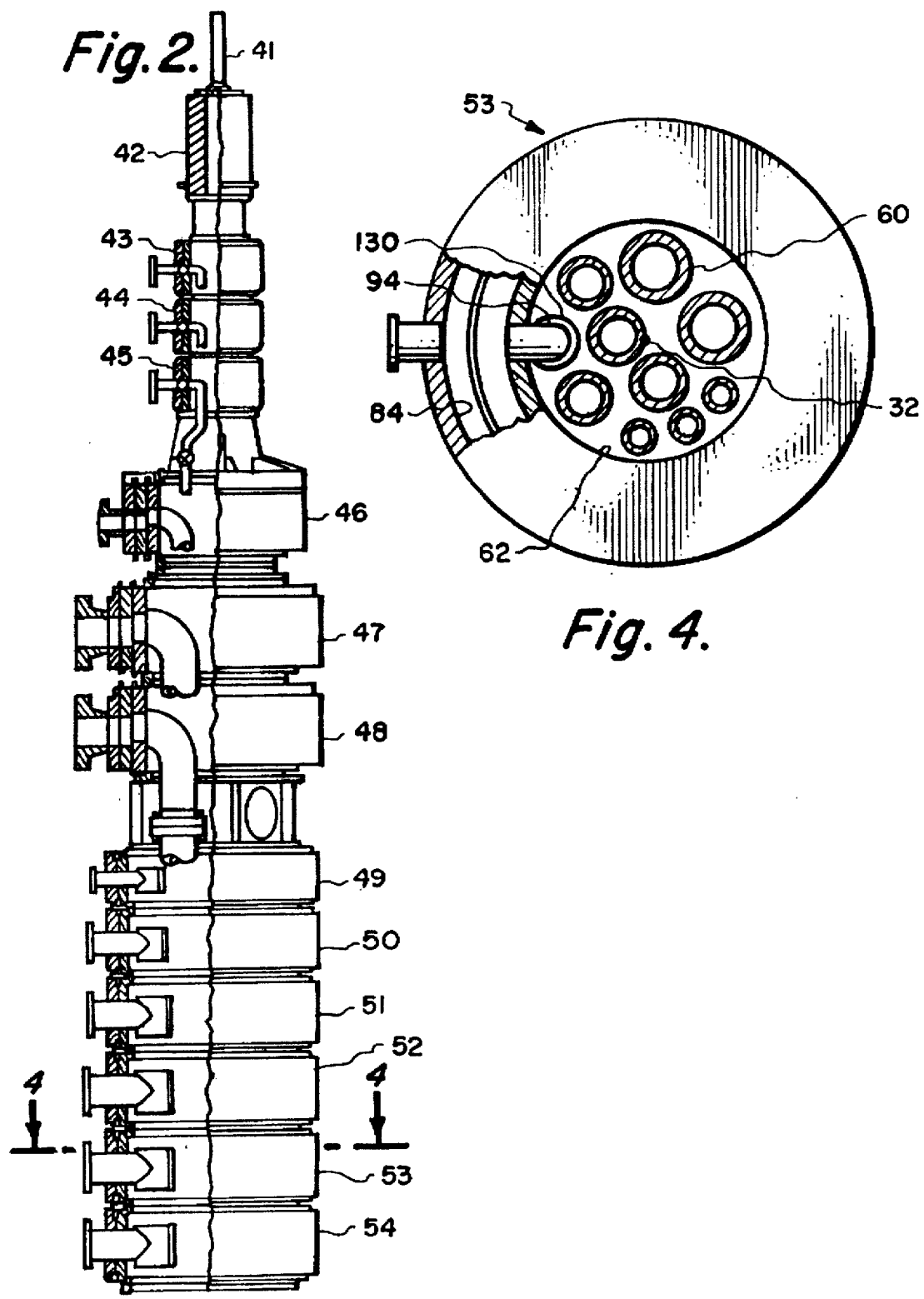

5,797,413

OFFSHORE FLUID SWIVEL SPARE

BACKGROUND OF THE INVENTION

One arrangement for producing hydrocarbons from undersea wells, includes a vessel with a turret that is anchored to the seafloor and that is connected by flow lines or conduits to the wells. The vessel can weathervane, that is, turn to different headings with changing winds and currents, with the turret being largely nonrotatable as the vessel rotates about it. The turret typically carries a fluid swivel arrangement that includes a stack of fluid swivels, with nonrotatable parts of the fluid swivels fixed to the turret and connected to the flow lines, and with rotatable parts of the fluid swivels fixed to the vessel to rotate with it about a largely vertical axis. All but the uppermost swivel of a stack have large holes lying on the axis, so pipes can extend up through the holes to the higher swivels. The more fluid swivels in a stack, the larger the required diameters of holes in the lower swivels. The larger the diameter of a swivel, the greater is its cost.

It is common to provide one or more spare fluid swivels along a stack. The seals of fluid swivels are the most likely components to fail, and a spare fluid swivel enables fluid to be routed from the failed swivel to the spare swivel. Every additional spare fluid swivel has required an additional pipe extending up to it and a valve arrangement below the fluid swivel arrangement for switching flow from one fluid swivel to the other. If a spare fluid swivel could be provided at minimal additional cost for it and any fluid swivels below it, this would reduce the cost of the fluid swivel arrangement.

SUMMARY OF THE INVENTION

In accordance with one embodiment of the present invention, a fluid swivel arrangement is provided which includes a pair of fluid swivels where one can serve as a spare to substitute for the other, which minimizes the additional piping required as a result of the spare swivel. A single pipe extends up through the hole in the lowermost of the pair of swivels and through any lower fluid swivel along the stack. A means is provided that switches flow from the single pipe, to a selected one of the two swivels of the pair. In one arrangement, a shut off valve lies above the inlet to the lower swivel but below the inlet to the upper swivel, so closing of the valve stops flow to the upper swivel. Flow to the lower fluid can be stopped by inserting a plug into the inlet port of the lower swivel.

The novel features of the invention are set forth with particularity in the appended claims. The invention will be best understood from the following description when read in conjunction with the accompanying drawings.

BRIEF DESCRIPTION OF THE DRAWINGS

FIG. 2 is a partially sectional side view of the fluid swivel arrangement of the offshore system of FIG. 1.

FIG. 4 is a top view of the pair of fluid swivels of FIG. 3, with a portion thereof shown in section.

DESCRIPTION OF THE PREFERRED EMBODIMENTS

Figure 1:
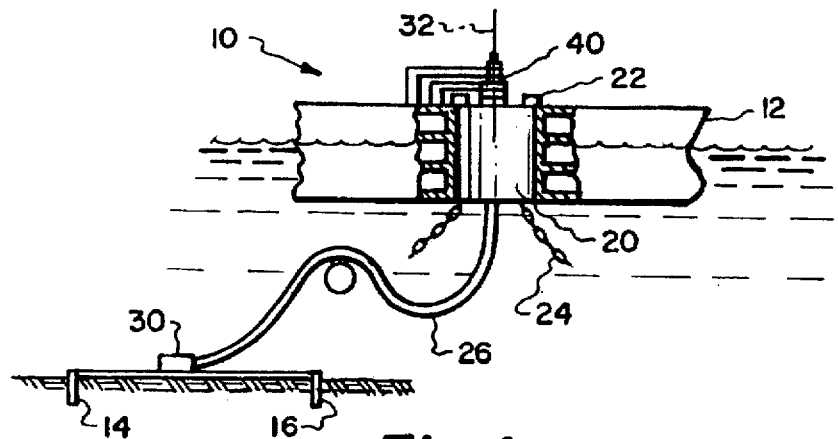
FIG. 1 is a partial sectional view of an offshore production system which includes the fluid swivel arrangement of the present invention.

FIG. 1 illustrates an offshore system 10 which includes a vessel 12 that lies in the vicinity of offshore hydrocarbon wells 14, 16. The vessel carries a turret 20 that is rotatably coupled to the vessel hull through bearings 22. The turret is anchored by catenary chains 24 and a flow line 26 carries fluid etc. between a seafloor base 30 that is connected to the wells, and the turret 20. When the direction of winds, currents, and waves changes, the vessel 12 may weathervane, or rotate without limit about the axis 32 of the turret. The turret 20 avoids rotating without limit (although it may rotate by several degrees) to avoid twisting of the catenary chains and flow line. The turret carries a fluid swivel arrangement 40 that permits continuous flow of fluid between the "nonrotatable" turret and the rotatable vessel as the vessel weathervanes.

FIG. 2 shows one example of a fluid swivel arrangement 40 that can be mounted on a turret. The particular arrangement 40 includes fourteen swivels, including swivel 41 for carrying electrical currents (e.g. from sensors near the wells to circuitry on the vessel, or from switches on the vessel to actuators at the undersea base) and a hydraulic swivel 42 that enables personnel on the vessel to operate hydraulic controls at the seafloor. Another group of swivels includes gas pressurization, gas import, and kickoff (oil) swivels 43, 44, and 45. Another group of swivel includes a gas lift and export swivel 46, a water injection swivel 47, and a water injection or gas (spare) swivel 48. Another group of swivels includes a test oil swivel 49, a turret fire water swivel 50, an upper produced oil swivel 51, a lower produced oil swivel 52, an oil (spare) swivel 53, and a treated oil (import) swivel 54. Swivel 48 is a spare for swivel 47, while swivel 53 is a spare for swivel 54. FIG. 4 is a sectional view taken on line 4—4 of FIG. 2, showing that a large number of pipes 60 must pass through the lower swivels to reach the upper ones. As a result, the lower swivels are constructed with large central holes 62 lying about the axis 32, to pass the large number of pipes 60. Previously, every fluid swivel, including a spare swivel, required an additional pipe 60.

Figure 3:
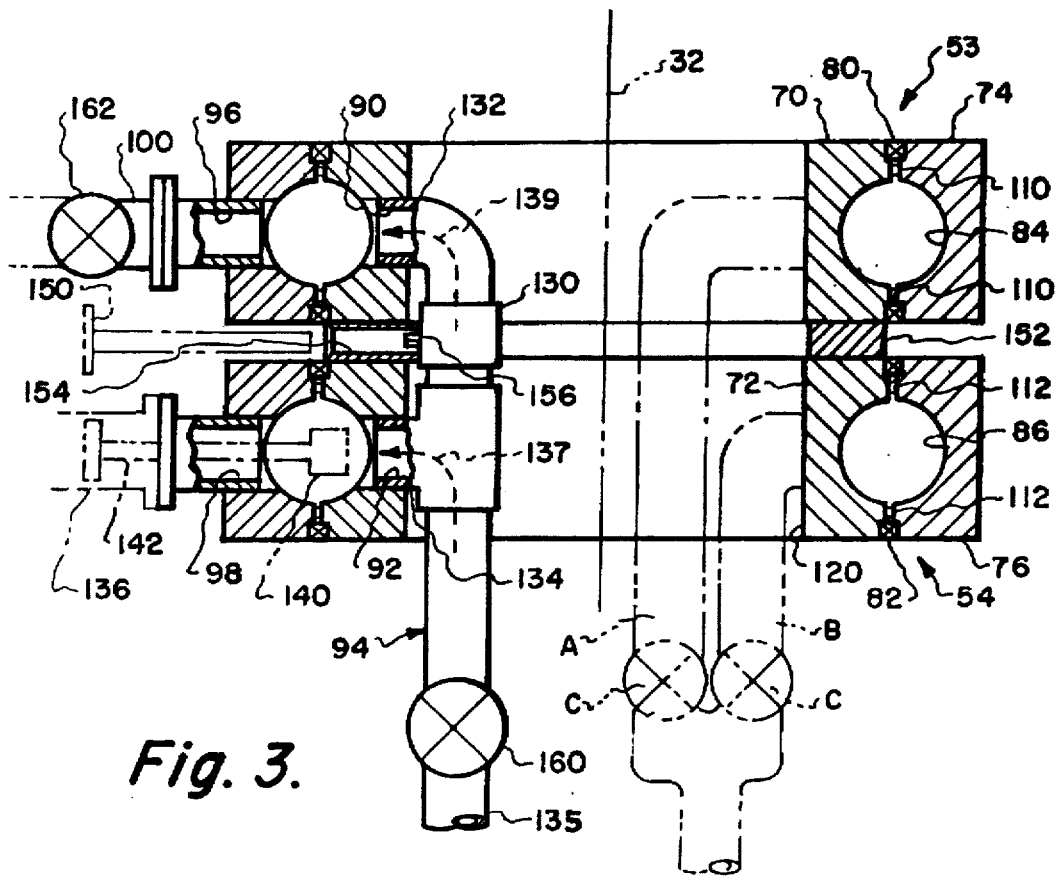
FIG. 3 is a sectional view of a pair of fluid swivels of the arrangement of FIG. 2.

FIG. 3 is a simplified sectional view showing the construction of two fluid swivels 53, 54 of the arrangement of FIG. 2. Each fluid swivel has an inner nonrotatable part 70, 72 (which undergoes only limited rotation) and an outer rotatable part 74, 76. Bearings 80, 82 on the two fluid swivels, enable each outer part 74, 76 to rotate about the inner part of the corresponding fluid swivel. Each fluid swivel has a ring-shaped chamber 84, 86 formed between the inner and outer parts. An inlet port 90, 92 of each inner swivel part can connect to a pipe 94, so fluid can pass through the pipe and the corresponding port 90, 92 into the corresponding chamber 84, 86. Each outer swivel part has an outlet port 96, 98 formed in the outer swivel part. Fluid entering the corresponding chamber 84, 86 can flow out through a corresponding outlet port 96, 98. For example, fluid moving out through the stationary pipe 94 and into the chamber 84, can flow out through the rotatable port 96 to flow through a rotatable pipe 100 that lies on the rotatable (weathervaning) vessel.

Each fluid swivel has sets of seals 110, 112 that prevent the leakage of fluid out of the corresponding chamber 86, 84. Failure of a fluid swivel seal is by far the most common cause of a fluid swivel failure. In order to minimize interruption of flow, it is common to provide a spare fluid swivel. The two fluid swivels 53, 54 form a pair, where one serves as a spare to be used in the event of a failure of the other. Previously, separate pipes such as A, B were provided to carry fluid to each fluid swivel, together with a valve device C lying below the fluid swivels for switching flow from one pipe to the other. The need for two pipes A, B resulted in the need for the pipe-receiving hole 120 in the lower swivels, to be larger. The holes 120 may be more than one meter in diameter, in order to pass multiple pipes. The more pipes that must pass through a swivel, the larger the diameter of the hole 120. When the hole 120 is larger, the diameters of the swivel parts, bearings, and seals, must be correspondingly larger, all of which adds to the cost of the fluid swivel.

Applicant provides an arrangement that avoids the need for two pipes A, B for the two swivels 53, 54, but instead enables the use of a single pipe 94. The single pipe 94 extends completely through the hole in the lower swivel and partially through the hole in the upper swivel, and is coupled to the inlet ports 90, 92 of both swivels. A small diameter shut off valve 130 is placed along the pipe, between upper and lower pipe locations 132, 134. If the valve 130 is closed, then fluid moving up the pipe 94 from a pipe bottom portion 135, flows only to the inlet 92 of the lower swivel, to flow along a path 137 through the lower fluid swivel to a pipe such as 136 fixed to the vessel. The shut off valve 130 can be a gate valve or butterfly valve, both of which have small diameters, so they do not greatly increase the amount of cross-sectional space required along the pipe 94. If the lower fluid swivel fails, then the shut off valve 130 can be opened to flow fluid to the upper swivel along path 139. In addition, fluid flow into the lower swivel inlet port 92 must be stopped, or else fluid could leak out through a damaged seal 112 of the lower swivel. It would be possible to provide another shut off valve along the lower location 134 by increasing the length of this pipe location, although this would add to the cross-sectional area taken up by the pipe 94. Applicant is able to close the lower swivel by plugging the lower inlet port 92.

FIG. 3 shows, in phantom lines, a plug 140 that is held at the end of a plug handling tool 142. With the pipe 136 disconnected, the lower swivel outer part 76 is turned about the axis 32 until the outer part 76 is aligned with the inlet port 92 of the inner part. The plug 140 is then inserted through the outlet 98 and through the chamber 86 into the lower inlet 92 to plug it. The inner surface of the pipe lower location 134 that lies within the lower inlet 92 can be formed with pipe threads, and the plug 140 can be formed with external pipe threads so it can be screwed into the inlet 92 to plug it. This prevents any fluid from flowing into the lower chamber 86 and leaking out through the lower chamber seals. It may be noted that applicant forms the lower swivel outlet 98 so it has a slightly larger diameter than the lower swivel inlet 92. This allows the plug 140 to pass through the outlet 98 and plug the inlet 92. The plug 140 and the valve 130 form valve apparatus, because each controls fluid flow through its respective location.

The shut off valve 130 can be operated with electrical or hydraulic fluid. However, applicant prefers simple operation by a valve operating tool 150 that is in the form of a wrench. A support structure 152 extends between the upper and lower swivels, and a passage 154 is provided therein, which enables a wrench tool 150 to be inserted therein and engage a nut 156 that is turned to operate the shut off valve.

Although almost all fluid swivels of the arrangement 40 of FIG. 2 require holes at their axes to pass pipes extending to other swivels, the uppermost swivel, if used to carry fluid (which is not the case in FIG. 2) can include rotatable and nonrotatable parts that do not have pipe-passing holes within them. The arrangement of FIG. 3 can be used in this situation, so only one pipe need pass through the swivel line directly below the uppermost one.

A procedure for switching the fluid swivels of FIG. 3, can include first shutting a lower shut off valve 160 to stop the flow of fluid to the swivels, in addition to closing upper valves such as 162 that control flow out of the swivels to storage or usage facilities on the vessel. Assuming that fluid was initially flowing through the upper swivel, but it began leaking, the shut off valve 130 is closed and a plug 140 lying in the lower swivel is removed. Then connections are made to the lower swivel outlet 98 to carry fluid from that swivel to facilities on the vessel (possibly by moving the end of pipe 100 to the position 136). If the upper swivel is to be repaired, fluid is drained from the upper swivel and the damaged seal is replaced.

In the event that fluid is passing to the lower swivel 86 and a leak develops in its seals, the valve 160 is closed and the shut off valve 130 is opened. The outer part 76 of the lower swivel is turned until it is in alignment with the lower swivel inlet port 92. Then the plug 140 is installed to block flow into the lower swivel. The lower valve 160 is then opened.

Although most flow is upwardly, fluid also can move from the vessel into a fluid swivel and downwardly therealong. Procedures similar to those described above can be used where a pair of swivels is used to carry fluid, such as injection water, so it moves downwardly along a pipe.

Where a pair of fluid swivels such as 47, 48 in FIG. 2 are paired so one can serve as a spare for the other, the use of a single pipe to carry fluid to both swivels, enables the use of smaller holes and therefore smaller swivels for all swivels 49–54 lying below the pair 47, 48. Reducing the diameters of swivels (e.g. as measured at their seals) greatly reduces their cost.

Thus, the invention provides a fluid swivel arrangement wherein a pair of fluid swivels are associated so one can serve as a spare for the other (and vice versa), which minimizes the required diameters of the fluid swivels below the upper swivel of the pair. A single pipe extends up to both swivels, with each pipe coupled to the port of the inner part of each swivel. Means are provided for controlling flow, to switch flow through the pipe to a selected one of the two fluid swivels. The means for switching can include plugs for one or both swivels, which can plug the inner port of a selected swivel to block the flow of fluid into that swivel. A shut off valve can be used for the uppermost of the two swivels, to block flow of fluid from the upper swivel.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A method for use with a fluid swivel arrangement that includes a plurality of fluid swivels lying in a stack along an axis, with a plurality of said fluid swivels having holes, and a plurality of pipes extending through said holes for carrying fluid up to said fluid swivels, which enables a second of a pair of said fluid swivels to be substituted for a first of the pair, comprising:

flowing fluid from a first of said pipes which extends through a hole of at least one of said fluid swivels of said pair, to said first fluid swivel of said pair;

blocking flow from said first pipe to said first fluid swivel and instead flowing fluid from said first pipe to said second swivel of said pair, whereby to enable one pipe to provide fluid for two fluid swivels.

2. The method described in claim 1 wherein:

said first fluid swivel includes inner and outer swivel parts that can rotate relative to each other about said axis and that form a ring-shaped chamber between them, with said inner swivel part having a hole lying on said axis, with said inner swivel part having an inlet port coupled to said first pipe and with said outer swivel part having an outlet port, and with said first pipe lying in said hole;

said step of blocking includes passing a plug through said outlet port of said first fluid swivel and through said chamber, into said inlet port to block said inlet port.

3. A fluid swivel arrangement comprising:

upper and lower fluid swivels lying along an axis with said upper fluid swivel lying above said lower fluid swivel, with each fluid swivel having a largely nonrotatable swivel part and a rotatable swivel part and having ports connected to each part so fluid can flow in through one port and flow out through the other port;

at least said lower fluid swivel is constructed so its inner and outer swivel parts are each ring shaped and form a ring-shaped chamber between them, with said inner swivel part having a hole for passing at least one pipe;

a pipe extending through said hole and coupled to the nonrotatable swivel parts of both said upper and lower fluid swivels;

means for controlling flow, which switches flow between said pipe and the rotatable part of a selected one of said upper and lower fluid swivels.

4. The arrangement described in claim 3 wherein:

said means for controlling flow includes a plug that can be inserted through a port of the rotatable swivel part of a first of said fluid swivels into the port of the nonrotatable swivel part of said first fluid swivel, to prevent the flow of fluid through said port of the nonrotatable part of said first fluid swivel.

5. The arrangement described in claim 3 wherein:

said pipe has upper and lower pipe portions connected respectively to the rotatable swivel parts of said upper and lower fluid swivels;

said means for controlling includes a valve lying in series with said pipe between said upper and lower pipe portions, so closing of said valve allows the passage of fluid between said pipe and only said lower fluid swivel.

6. The arrangement described in claim 5 including:

a structure lying between said upper and lower fluid swivels that supports said upper swivel on said lower swivel, with said structure having a structure portion lying between said fluid swivels, said structure portion having a passage for passing a tool to operate said valve.

7. A fluid swivel arrangement comprising:

upper and lower fluid swivels, each comprising inner and outer swivel parts that form a ring-shaped chamber between them and that are relatively rotatable about a vertical axis, and a plurality of seals that seal each of said inner swivel parts to one of said outer swivel parts to prevent the leakage of fluid from said chambers, with each inner swivel part having an inlet port and with each outer swivel port having an outlet port, and with each inner swivel part having a pipe-passing hole;

a pipe having a bottom portion for carrying fluid up toward said swivels, said pipe having an upper portion extending through the hole of said lower fluid swivel and into the hole of said upper fluid swivel and connected to the inlet port of the inner swivel part of each of said fluid swivels, so fluid can flow in a first path through said pipe, through the inlet port of said lower fluid swivel, through said chamber of said lower fluid swivel and through the outlet port of said lower fluid swivel, and fluid can flow in a second path through said pipe, through the inlet port of said upper fluid swivel, through said chamber of said upper fluid swivel and through the outlet port of said upper fluid swivel;

valve apparatus located along each of said flow paths between said pipe bottom portion and said chambers, whereby to enable fluid to flow along a selected one of said flow paths so if a seal of one of said fluid swivels fails the valve apparatus can be operated to flow fluid through the other fluid swivel.

8. The arrangement described in claim 7 wherein said pipe has a lower location where said pipe is connected to the port at the swivel inner part of said lower fluid swivel, and said pipe has a higher location where said pipe is connected to the port at the inner swivel part of said upper fluid swivel;

said valve apparatus includes a shutoff valve located along said pipe between said lower and higher locations thereof, to alternately allow and stop the flow of fluid to said port at the inner swivel part of said upper fluid swivel.

9. The arrangement described in claim 7 wherein:

said valve apparatus comprises a plug that is insertable into the inlet port of a selected one of said fluid swivels to block the port.

* * * * *